US012580253B2

(12) United States Patent
Zhao

(10) Patent No.: US 12,580,253 B2
(45) Date of Patent: Mar. 17, 2026

(54) TYPE OF CAP FOR CYLINDRICAL LITHIUM BATTERY AND NEW TYPE OF CYLINDRICAL LITHIUM BATTERY

(71) Applicant: SHENZHEN BAK POWER BATTERY CO., LTD., Shenzhen (CN)

(72) Inventor: Junfeng Zhao, Shenzhen (CN)

(73) Assignee: SHENZHEN BAK POWER BATTERY CO., LTD., Shenzhen (CN)

( * ) Notice: Subject to any disclaimer, the term of this patent is extended or adjusted under 35 U.S.C. 154(b) by 726 days.

(21) Appl. No.: 17/777,935

(22) PCT Filed: Aug. 6, 2021

(86) PCT No.: PCT/CN2021/111309
§ 371 (c)(1),
(2) Date: Nov. 22, 2022

(87) PCT Pub. No.: WO2022/088829
PCT Pub. Date: May 5, 2022

(65) Prior Publication Data
US 2023/0136533 A1      May 4, 2023

(30) Foreign Application Priority Data

Oct. 29, 2020    (CN) ........................ 202022454119.X

(51) Int. Cl.
*H01M 50/152*      (2021.01)
*H01M 10/0525*      (2010.01)
(Continued)

(52) U.S. Cl.
CPC ..... *H01M 50/143* (2021.01); *H01M 10/0525* (2013.01); *H01M 50/152* (2021.01);
(Continued)

(58) Field of Classification Search
CPC ............. H01M 50/147; H01M 50/148; H01M 50/152; H01M 50/166–171;
(Continued)

(56) References Cited

U.S. PATENT DOCUMENTS

2003/0013005 A1      1/2003   Chang et al.
2005/0260487 A1      11/2005  Kim et al.
(Continued)

FOREIGN PATENT DOCUMENTS

CN            2845183   Y    12/2006
CN            101170169 A     4/2008
(Continued)

OTHER PUBLICATIONS

Yang (CN 209389114 U) Machine Translation (Year: 2019).*
(Continued)

*Primary Examiner* — Jeremiah R Smith
(74) *Attorney, Agent, or Firm* — Westman, Champlin & Koehler, P.A.

(57)      ABSTRACT

The present application provides a new type of cap for a cylindrical lithium battery, which includes a steel sheet, an explosion-proof sheet, a connection piece, a spacer ring and a seal ring. The steel sheet is defined with a through hole. The explosion-proof disc is arranged on one side of the steel sheet, and the explosion-proof disc is provided with a wrap edge, and the wrap edge is extended from an edge of the steel sheet to another side of the steel sheet and then to an edge of the through hole. The middle portion of the connection piece is in contact with the middle portion of the explosion-proof disc. The spacer ring is arranged between the explosion-proof disc and the connection piece. The seal ring is arranged around the explosion-proof disc, the connection piece and the spacer ring.

14 Claims, 2 Drawing Sheets

(51) Int. Cl.

| | |
|---|---|
| *H01M 50/143* | (2021.01) |
| *H01M 50/159* | (2021.01) |
| *H01M 50/162* | (2021.01) |
| *H01M 50/184* | (2021.01) |
| *H01M 50/186* | (2021.01) |
| *H01M 50/188* | (2021.01) |

(52) U.S. Cl.
CPC ....... *H01M 50/159* (2021.01); *H01M 50/162* (2021.01); *H01M 50/184* (2021.01); *H01M 50/186* (2021.01); *H01M 50/188* (2021.01)

(58) Field of Classification Search
CPC ............. H01M 50/159; H01M 50/162; H01M 50/179; H01M 50/188
See application file for complete search history.

(56) References Cited

U.S. PATENT DOCUMENTS

| | | | |
|---|---|---|---|
| 2006/0019158 | A1 | 1/2006 | Mori et al. |
| 2009/0208830 | A1 | 8/2009 | Okabe et al. |
| 2011/0008654 | A1 | 1/2011 | Kim et al. |
| 2012/0040215 | A1 | 2/2012 | Zhu |
| 2014/0004396 | A1 | 1/2014 | An |
| 2018/0069268 | A1 | 3/2018 | Nakamura et al. |
| 2019/0103625 | A1 | 4/2019 | Haraguchi et al. |
| 2020/0295319 | A1* | 9/2020 | Ko ........................ B23K 26/08 |
| 2022/0029232 | A1 | 1/2022 | Kashimura et al. |

FOREIGN PATENT DOCUMENTS

| | | | |
|---|---|---|---|
| CN | 201623187 | U | 11/2010 |
| CN | 201820810 | U | 5/2011 |
| CN | 101170167 | B | 1/2012 |
| CN | 102306712 | A | 1/2012 |
| CN | 102629688 | A | 8/2012 |
| CN | 202905891 | U | 4/2013 |
| CN | 204441382 | U | 7/2015 |
| CN | 106410102 | A | 2/2017 |
| CN | 206040781 | U | 3/2017 |
| CN | 206040782 | U | 3/2017 |
| CN | 206711986 | U | 12/2017 |
| CN | 206742369 | U | 12/2017 |
| CN | 207676956 | | 7/2018 |
| CN | 207676956 | U | 7/2018 |
| CN | 208225932 | U | 12/2018 |
| CN | 208284541 | U | 12/2018 |
| CN | 208284552 | U | 12/2018 |
| CN | 208422973 | U | 1/2019 |
| CN | 208986073 | U | 6/2019 |
| CN | 209389074 | U | 9/2019 |
| CN | 209389114 | U | 9/2019 |
| CN | 110379993 | A | 10/2019 |
| CN | 209472006 | U | 10/2019 |
| CN | 209472008 | U | 10/2019 |
| CN | 110504401 | A | 11/2019 |
| CN | 210403784 | U | 4/2020 |
| CN | 211789215 | U | 10/2020 |
| CN | 213520044 | U | 6/2021 |
| CN | 213520231 | U | 6/2021 |
| CN | 213520238 | U | 6/2021 |
| CN | 214336803 | U | 10/2021 |
| JP | 2007250442 | A | 9/2007 |
| WO | 2007/134091 | | 11/2007 |
| WO | 2007134091 | A2 | 11/2007 |
| WO | 2020/137778 | | 2/2020 |
| WO | 2022088827 | A1 | 5/2022 |
| WO | 2022088828 | A1 | 5/2022 |

OTHER PUBLICATIONS

Pei (CN-201623187-U) translation plus original (Year: 2010).*
Extended European Search Report in corresponding European application No. 21870550.7 dated Feb. 2, 2024.
The Extended European Search Report from corresponding European Application No. 21870562.2, dated Sep. 17, 2024.
First Office Action from corresponding Chinese Patent Application No. 202011178413.0, dated Nov. 13, 2024; machine translation.
Office Action from related U.S. Appl. No. 17/743,781, dated Oct. 23, 2024.
Office Action from related U.S. Appl. No. 17/774,602, dated Oct. 30, 2024.
Extended European Search Report from corresponding European Patent Application No. 21870549.9, dated Feb. 2, 2024.
International Search Report dated Nov. 2, 2021 for PCT/CN2021/111287, filed Aug. 6, 2021.
Written Opinion dated Nov. 2, 2021 for PCT/CN2021/111287, filed Aug. 6, 2021.
International Search Report and Written Opinion dated Nov. 1, 2021 for PCT/CN2021/111311, filed Aug. 6, 2021.
International Search Report and Written Opinion dated Sep. 28, 2021 for PCT/CN2021/111288, filed Aug. 6, 2021.
Written Opinion dated Oct. 26, 2021 for PCT/CN2021/111309, filed Aug. 6, 2021.
International Search Report dated Oct. 26, 2021 for PCT/CN2021/111309, filed Aug. 6, 2021.
Extended European Search Report from corresponding European Patent Application No. 21870550.7, dated Feb. 2, 2024.
U.S. Appl. No. 17/774,602, filed May 5, 2022 "Cap for Full-Tab Cylindrical Lithium Battery and Full-Tab Cylindrical Lithium Battery".
U.S. Appl. No. 17/777,935, filed May 18, 2022 "New Type of Cap for Cylindrical Lithium Battery and New Type of Cylindrical Lithium Battery".
U.S. Appl. No. 17/743,781, filed May 13, 2022 "Cylindrical Battery Cap and Cylindrical Battery".
U.S. Appl. No. 17/778,915, filed May 20, 2022 "Current Collecting Plate and Cylindrical Lithium Battery".
International Search Report and Written Opinion for corresponding International Application No. PCT/CN2021/111309 dated Sep. 30, 2021.
The Extended European Search Report from European Patent Application No. 21870560.6, dated Apr. 14, 2025.
Office Action from U.S. Appl. No. 17/778,915, dated Mar. 13, 2025.
International Search Report and Written Opinion from PCT/CN2021/111311, dated Nov. 1, 2021.
Written Opinion from PCT/CN2021/111309, dated Oct. 26, 2021.
Written Opinion from PCT/CN2021/111287, dated Nov. 2, 2021.
International Search Report and Written Opinion from PCT/CN2021/111288, dated Sep. 28, 2021.
Office Action from U.S. Appl. No. 17/774,602, dated Feb. 3, 2025.
Office Action from U.S. Appl. No. 17/774,602, dated Apr. 25, 2025.

* cited by examiner 41          40

TYPE OF CAP FOR CYLINDRICAL LITHIUM BATTERY AND NEW TYPE OF CYLINDRICAL LITHIUM BATTERY

CROSS-REFERENCE TO RELATED APPLICATION

This application is a National Stage Appl. filed under 35 USC 371 of International Patent Application No. PCT/CN2021/111309 with an international filing date of Aug. 6, 2021, designating the United States, which claims the priority of the Chinese Patent Application No. 202022454119.X, filed on Oct. 29, 2020, the entire contents of which are incorporated herein by reference.

TECHNICAL FIELD

The present application relates to the field of lithium battery technologies, and more particularly, to a new type of cap for a cylindrical lithium battery and a new type of cylindrical lithium battery.

BACKGROUND

The existing cap for a cylindrical lithium battery includes a top cover, an explosion-proof disc, a spacer ring, a connection piece and a seal ring. The top cover is sequentially connected with the explosion-proof disc, the spacer ring and the connection piece to form an inner core of the cap, and the seal ring is sleeved on the periphery of the inner core of the cap. The cap for the cylindrical lithium battery effectively reduces formation of aluminum molten beads and improves safety performance of the overall battery pack. However, the existing cylindrical battery cap has many components, and each component needs to be matched layer by layer, resulting in a high internal resistance of the cylindrical battery cap. In addition, when the internal pressure of the battery becomes too high, the notch on the explosion-proof disc, under the pressure of the top cover structure, cannot be broken in time, which may easily lead to a risk of thermal runaway of the battery and cause a safety hazard.

Technical Problem

An objective of embodiments of the present application is to provide a new type of cap for the cylindrical lithium battery, aiming to solve the problems in the existing cylindrical battery caps that when the internal pressure of the battery is too high, the notch on the explosion-proof disc, under the pressure of the top cover structure, cannot be broken in time, which may easily lead to the risk of thermal runaway of the battery, meanwhile, the cap, in use, has a large resistance, and lacks of a positive welding platform.

Technical Solutions

In order to achieve the above objective, a solution adopted in the present application is to provide a new type of cap for the cylindrical lithium battery, which includes: a steel sheet, an explosion-proof disc, a connection piece, a spacer ring, and a seal ring. The steel sheet is defined with a through hole. The explosion-proof disc is arranged on one side of the steel sheet, and the explosion-proof disc is provided with a wrap edge. The wrap edge is extended from an edge of the steel sheet to another side of the steel sheet and then to an edge of the through hole. A middle portion of the connection piece is in contact with a middle portion of the explosion-proof disc. The spacer ring is arranged between the explosion-proof disc and the connection piece. The seal ring is arranged around the explosion-proof disc, the connection piece and the spacer ring.

Further, the explosion-proof disc is recessed toward the connection piece to form a groove, and the spacer ring is sleeved on a periphery of the groove.

Further, the edge of the through hole is provided with a flange, and the flange is in contact with an inner wall of the groove.

Further, the explosion-proof disc is provided with a rupture score line.

Further, the rupture score line is arranged on a side of the groove facing the connection piece.

Further, the spacer ring is provided with a support portion supported on an outer side of a bottom of the groove.

Further, an edge of the connection piece is provided with a bend portion, and the spacer ring is provided with an annular slot matching with the bend portion to form an engagement.

Further, the seal ring is provided with a wrap portion, and the wrap portion is wrapped on an outer side of the explosion-proof disc.

Further, the seal ring is a plastic seal ring.

In accordance with an embodiment of the present application, a new type of cylindrical lithium battery is also provided, which includes the new type of cap for the cylindrical lithium battery described in any of the above embodiments.

Beneficial Effects

Beneficial effect of the new type of cap for the cylindrical lithium battery provided by the present application is that: the new type of cap for the cylindrical lithium battery of the present application, compared with the existing technologies, removes the steel cap by defining a through hole on the steel sheet. The wrap edge of the explosion-proof disc is extended to the edge of the through hole on the steel sheet, so that the external aluminum wire, when being welded, can be welded on the wrap edge of the aluminum explosion-proof disc, which reduces the contact resistance between the aluminum wire and the nickel-plated steel cap in the past. Meanwhile, a sufficient explosion venting area is formed at the through hole. When the internal pressure of the battery becomes too high, the notch on the explosion-proof disc will be broken, then the explosion-proof disc is broken, and the air flow will escape from the through-hole area of the steel sheet to ensure the safety of the battery, which avoids the risk of thermal runaway of the battery that may be easily caused by the nickel-plated steel cap used in the existing technologies, when the internal pressure of the battery is too high. At the same time, in the present application, the steel cap in the cap is removed, thereby effectively reducing the contact resistance of the cap, and the wrap edge is extended to the through hole of the steel sheet, which can ensure the structural strength of the cap.

BRIEF DESCRIPTION OF THE DRAWINGS

In order to illustrate the solutions in the embodiments of the present application more clearly, the following briefly introduces the drawings that need to be used in description of the embodiments or the existing technologies. Obviously, the drawings in the following description are merely some embodiments of the present application. For those of ordinary skill in the art, other drawings may also be obtained according to these drawings without any creative effort.

Figures 1, 2:
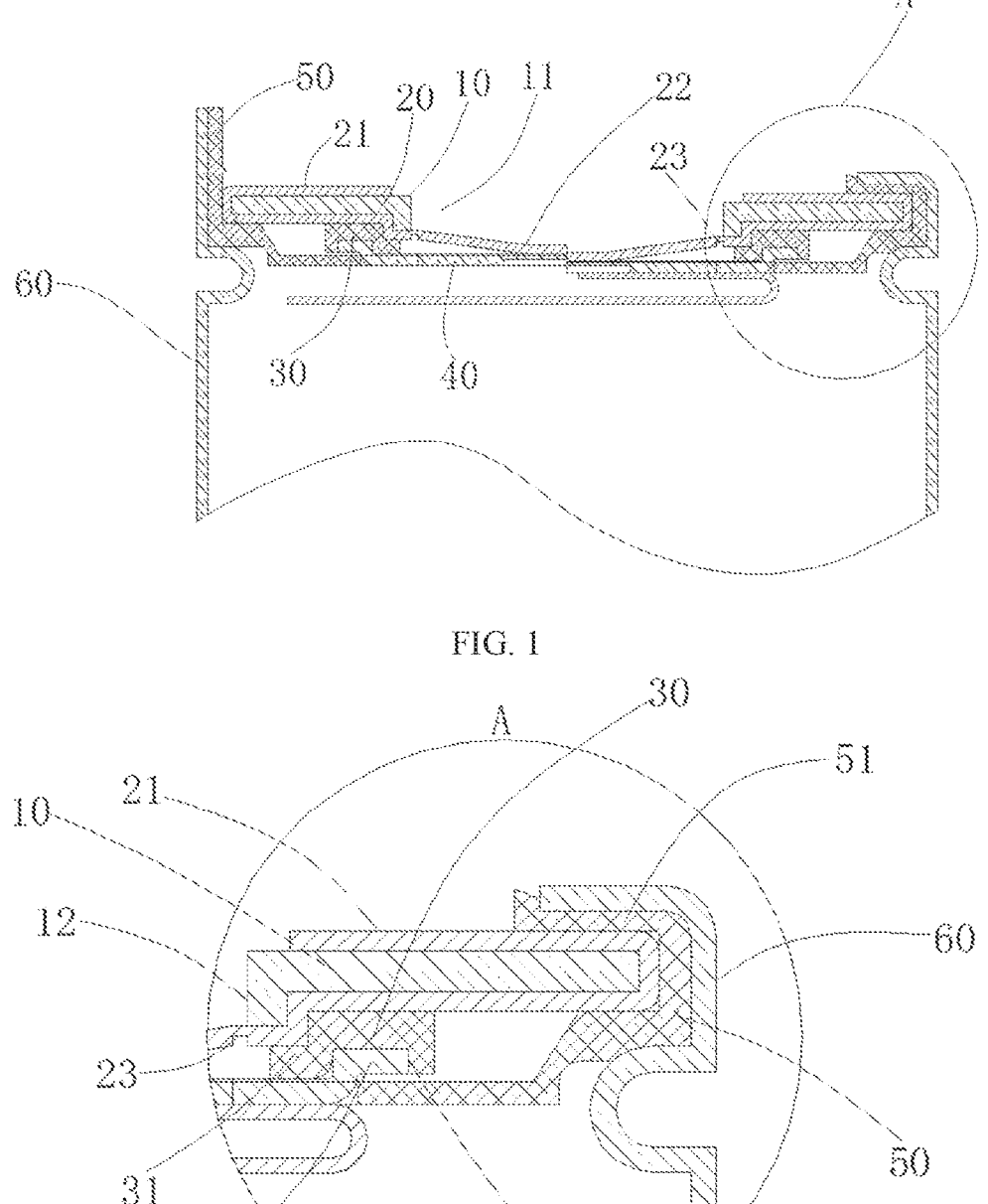
FIG. 1 is a schematic cross-sectional structural diagram of a new type of cap for a cylindrical lithium battery in accordance with an embodiment of the present application.
FIG. 2 is an enlarged structural representation of portion A taken from FIG. 1.

Reference symbols involved in the above drawings are listed as follows:

10—steel sheet; 11—through hole; 12—flange;
    20—explosion-proof disc; 21—wrap edge; 22—groove;
       23—rupture score line;
    30—spacer ring; 31—support portion; 32—ring groove;
    40—connection piece; 41—bend portion;
    50—seal ring; 51—wrap portion; and
    60—cylindrical shell.

DETAILED DESCRIPTION OF THE EMBODIMENTS

In order to make the problems to be solved, solutions and beneficial effects of the present application clearer, the present application will be further described in detail below with reference to the drawings and embodiments. It should be understood that the specific embodiments described herein are intended only to explain the present application, but not to limit the present application.

It should be noted that when an element is referred to as being "fixed to" or "arranged/disposed on" another element, it can be directly or indirectly on the other element. When an element is referred to as being "connected to" another element, it can be directly or indirectly connected to the other element.

It should be understood that the terms indicating the orientation or positional relationship, such as "upper", "lower", "front", "rear", "left", "right", "vertical", "horizontal", "top", "bottom", "inside", "outside", etc. are based on the orientation or positional relationship shown in the drawings, which are used only for convenience of describing the present application and simplifying the description, rather than indicating or implying the device or element: referred to must have a particular orientation, be constructed and operated in a particular orientation, and therefore should not be construed as limitations to the present application.

In addition, the terms "first" and "second" are used only for descriptive purposes, and should not be construed as indicating or implying relative importance or implying the number of the indicated features. Thus, a feature defined with "first" or "second" may expressly or implicitly include one or more of that feature. In the description of the present application, the phase "a/the plurality of" means two or more, unless otherwise expressly and specifically defined.

In order to illustrate the solutions described in the present application, a detailed description is given below with reference to the specific drawings and embodiments.

Figure 3:
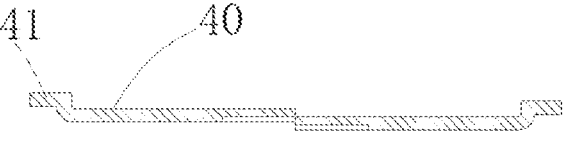
FIG. 3 is a schematic structural diagram of a connection piece of the new type of cap for the cylindrical lithium battery in accordance with an embodiment of the present application.

As shown in FIGS. 1 to 3, an embodiment of the present application provides a new type of cap for a cylindrical lithium battery, which includes a steel sheet 10, an explosion-proof disc 20, a connection piece 40, a spacer ring 30 and a seal ring 50. The steel sheet 10 is defined with a through hole 11. The explosion-proof disc 20 is arranged on one side of the steel sheet 10, and the explosion-proof disc 20 is provided with a wrap edge 21. The wrap edge 21 is configured to extend from an edge of the steel sheet 10 to another side of the steel sheet 10 and then to the edge of the through hole 11. The middle portion of the connection piece 40 is in contact with the middle portion of the explosion-proof disc 20. The spacer ring 30 is arranged between the explosion-proof disc 20 and the connection pieces 40. The seal ring 50 is arranged around the explosion-proof disc 20, the connection piece 40 and the spacer ring 30.

In the new type of cap for the cylindrical lithium battery provided in this embodiment, the steel sheet 10 is defined with the through hole 11, such that the steel cap can be removed from the cap. The wrap edge 21 of the explosion-proof disc 20 is extended to the edge of the through hole 11 on the steel sheet 10, so that the external aluminum wire, when being welded, can be welded on the wrap edge 21 of the aluminum explosion-proof disc 20, which reduces the contact resistance between the aluminum wire and the nickel-plated steel cap in the past. Meanwhile, a sufficient explosion venting area is formed at the through hole 11, when the internal pressure of the battery becomes too high, the notch on the explosion-proof disc 20 will be broken, then the explosion-proof disc 20 is broken, and the air flow will escape from the through-hole area of the steel sheet to ensure the safety of the battery, such that the risk of thermal runaway of the battery that may be easily caused by the nickel-plated steel cap used in the existing technologies, when the internal pressure of the battery is too high, can be avoided. At the same time, in the present application the steel cap is removed from the cap, thereby effectively reducing the resistance of the cap, and the wrap edge 21 is extended to the through hole 11 of the steel sheet 10, which can ensure the structural strength of the cap.

It should be noted that the explosion-proof disc 20 may be made of aluminum material.

In some embodiments of the present application, optionally, as shown in FIG. 1 and FIG. 2, the explosion-proof disc 20 is recessed toward the connection piece 40 to form a groove 22, and the spacer ring 30 is sleeved on the periphery of groove 22.

In this embodiment, the groove 22 is arranged so that the spacer ring 30 is annularly attached to the periphery of the groove 22, that is, the spacer ring 30 is attached to a side of the explosion-proof disc 20 facing away from the steel sheet 10. The groove 22 has a simple structure, which is convenient for the assembly of the spacer ring 30. Meanwhile, the position of the groove 22 and the through hole 11 forms an explosion venting area, and the bottom of the groove 22 is connected to the connection piece 40, which enables the connection piece 40 to bear the force on the explosion-proof piece 20, when the internal pressure of the battery is too high, so that the explosion-proof disc 20 can be broken, thereby facilitating the gas exhaust and pressure relief.

Further, as shown in FIG. 1, the bottom of the groove 22 is arc-shaped, so that the outer side of the bottom of the groove 22 is connected to the middle portion of the connection piece 40.

In some embodiments of the present application, optionally, as shown in FIG. 1 and FIG. 2, the edge of the through hole 11 is provided with a flange 12, and the flange 12 is arranged in contact with an inner wall of the groove 22.

In this embodiment, the edge of the through hole 11 forms the flange 12, that is, the inner edge of the steel sheet 10 forms a flange 12 bent in a direction towards the explosion-proof disc 20, and the flange 12 abuts against the inner wall of the groove 22, thereby improving the fixation of the steel sheet 10 and ensuring the overall structural strength of the product.

In some embodiments of the present application, optionally, as shown in FIG. 1 and FIG. 2, a rupture score line 23 is provided on the explosion-proof disc 20.

In this embodiment, due to the arrangement of the rupture score line 23, the air flow is more likely to break through the rupture score line 23 on the explosion-proof disc 20 when the air pressure inside the battery is too high, then the explosion-proof disc 20 is broken, and the air flow will escape from the rupture area to ensure safety of the battery.

In the above embodiment of the present application, optionally, as shown in FIG. 1 and FIG. 2, the rupture score line 23 is provided on the side of the groove 22 facing the connection piece 40.

In this embodiment, the rupture score line 23 is provided on the side of the groove 22 facing the connection piece 40, that is, the rupture score line 23 is located on the side where the explosion-proof disc 20 contacts the connection piece 40. Therefore, when the connection piece 40 applies a pressure in the direction towards the groove 22 due to gas pressure accumulation inside the battery, the rupture score line 23 of the explosion-proof disc 20 is more likely to break under the pressure of the flange 12 of the steel sheet 10, ensuring the rupture and gas exhaust can be carried out in time. In addition, the flange 12 of the steel sheet 10 is in contact with the inner wall of the groove 22 of the explosion-proof disc 20, and is arranged close to the rupture score line 23, such that the occurrence of the rupture score line 23 of the explosion-proof disc 20, in the absence of the pressure of the steel sheet 10 and the flange 12, being easy to inflate upward to produce flatulence, resulting in the rupture score line 23 being difficult to break, can be avoided, thereby avoiding thermal runaway of the battery, ensuring the safety performance of the battery, and meeting the needs of customers.

In some embodiments of the present application, optionally, as shown in FIG. 1 and FIG. 2, the spacer ring 30 is provided with a support portion 31 that is supported on the outer side of the bottom of the groove 22.

In this embodiment, the support portion 31 on the spacer ring 30 is arranged so that the support portion 31 is supported between the outer corners of the groove 22 and the connection piece 40, such that the spacer ring 30 is completely fitted between the explosion-proof disc 20 and the connection piece 40.

In some embodiments of the present application, optionally, as shown in FIG. 1 and FIG. 3, the edge of the connection piece 40 is provided with a bend portion 41, and the spacer ring 30 is provided with an annular slot 32 matching with the shape of the bend portion 41 to form an engagement.

In this embodiment, the edge of the connection piece 40 is bent to form the bend portion 41, and the annular slot 32 is formed on the side of the spacer 30 facing the connection piece 40, so that the bend portion 41 is engaged with the annular slot 32, which facilitates the positioning and assembly of the spacer ring 30, and improves the assembly efficiency of the spacer ring 30, thereby improving the production efficiency of the battery, reducing the production cost of the battery, and improving the market competitiveness of the battery product.

In some embodiments of the present application, optionally, as shown in FIG. 1 and FIG. 2, the seal ring 50 is provided with a wrap portion 51, and the wrap portion 51 wraps on the explosion-proof disc 20 from the outside.

Optionally, the seal ring 50 is a plastic seal ring 50.

In this embodiment, the seal ring 50 may be made of a plastic material, and the wrap portion 51 is configured to crimp the wrap edge 21 of the explosion-proof disc 20 to improve the sealing effect.

As shown in FIG. 1 and FIG. 2, an embodiment of the present application further provides a new type of cylindrical lithium battery, which includes the new type of cap for the cylindrical lithium battery described in any of the above embodiments.

Optionally, a cylindrical casing 60 of the new type of cylindrical lithium battery is fixedly connected to the seal ring 50 and is sleeved on the periphery of the new type of cap for the cylindrical lithium battery.

The new type of cylindrical lithium battery in accordance with embodiment of the present application has the new type of cap for the cylindrical lithium battery described in any of the above embodiments, and therefore, has all the beneficial effects of the new type of cap for the cylindrical lithium battery, which will not be repeated here.

In conclusion, the new type of cap for the cylindrical lithium battery provided by the embodiment of the present application removes the steel cap by defining a through hole on the steel sheet, and the wrap edge of the explosion-proof disc is extended to the edge of the through hole on the steel sheet, so that the external aluminum wire when being welded, can be welded on the wrap edge of the aluminum explosion-proof disc, which reduces the contact resistance between the aluminum wire and the nickel-plated steel cap in the past. Meanwhile, a larger explosion venting area is formed at the through hole, when the internal pressure of the battery becomes too high, the notch on the explosion-proof disc will be broken, then the explosion-proof disc is broken, and the air flow will escape from the through-hole area of the steel sheet to ensure the safety of the battery, so that the risk of thermal runaway of the battery that may be easily caused by the nickel-plated steel cap used in the existing technologies, when the internal pressure of the battery is too high, can be avoided. At the same time, in the present application, the steel cap in the cap is removed, thereby effectively reducing the contact resistance of the cap, and the wrap edge 21 is extended to the through hole 11 of the steel sheet 10, which can ensure the structural strength of the cap.

The above descriptions are only optional embodiments of the present application, and are not intended to limit the present application. Any modifications, equivalent replacements and improvements made within the spirit and principles of the present application shall be included within the protection scope of the present application.

What is claimed is:

1. A cap for a cylindrical lithium battery, comprising:
   a steel sheet, the steel sheet being defined with a through hole;
   an explosion-proof disc, the explosion-proof disc being arranged on one side of the steel sheet, and the explosion-proof disc being provided with a wrap edge, the wrap edge extending from an edge of the steel sheet to another side of the steel sheet and then to an edge of the through hole;
   a connection piece, wherein a middle portion of the connection piece is in contact with a middle portion of the explosion-proof disc;
   a spacer ring, the spacer ring being arranged between the explosion-proof disc and the connection piece; and
   a seal ring, the seal ring being arranged around the explosion-proof disc, the connection piece and the spacer ring, wherein the explosion-proof disc is recessed toward the connection piece to form a groove at a periphery thereof, and the spacer ring is received in the groove of the explosion-proof disk, such that a cross-sectional profile of the spacer ring conforms with a cross-sectional profile of the explosion-proof disk, wherein the edge of the through hole is provided with a flange, and the flange is in contact with an inner wall of the groove.

2. The cap for a cylindrical lithium battery according to claim 1, wherein the explosion-proof disc is provided with a rupture score line.

3. The cap for a cylindrical lithium battery according to claim 2, wherein the rupture score line is arranged on a side of the groove facing the connection piece.

4. The cap for a cylindrical lithium battery according to claim 1, wherein the spacer ring is provided with a support portion supported on an outer side of a bottom of the groove.

5. The cap for a cylindrical lithium battery according to claim 1, wherein an edge of the connection piece is provided with a bend portion, and the spacer ring is provided with an annular slot matching with the bend portion to form an engagement.

6. The cap for a cylindrical lithium battery according to claim 1, wherein the seal ring is provided with a wrap portion, and the wrap portion is wrapped on an outer side of the explosion-proof disc.

7. The cap for a cylindrical lithium battery according to claim 6, wherein the seal ring is a plastic seal ring.

8. A cylindrical lithium battery, comprising:

a cap for a cylindrical lithium battery, comprising:

a steel sheet, the steel sheet being defined with a through hole;

an explosion-proof disc, the explosion-proof disc being arranged on one side of the steel sheet, and the explosion-proof disc being provided with a wrap edge, the wrap edge extending from an edge of the steel sheet to another side of the steel sheet and then to an edge of the through hole;

a connection piece, wherein a middle portion of the connection piece is in contact with a middle portion of the explosion-proof disc;

a spacer ring, the spacer ring being arranged between the explosion-proof disc and the connection piece; and a seal ring, the seal ring being arranged around the explosion-proof disc, the connection piece and the spacer ring, wherein the explosion-proof disc is recessed toward the connection piece to form a groove at a periphery thereof, and the spacer ring is received in the groove of the explosion-proof disk, such that a cross-sectional profile of the spacer ring conforms with a cross-sectional profile of the explosion-proof disk, wherein the edge of the through hole is provided with a flange, and the flange is in contact with an inner wall of the groove.

9. The cylindrical lithium battery according to claim 8, wherein the explosion-proof disc is provided with a rupture score line.

10. The cylindrical lithium battery according to claim 9, wherein the rupture score line is arranged on a side of the groove facing the connection piece.

11. The cylindrical lithium battery according to claim 8, wherein the spacer ring is provided with a support portion supported on an outer side of a bottom of the groove.

12. The cylindrical lithium battery according to claim 8, wherein an edge of the connection piece is provided with a bend portion, and the spacer ring is provided with an annular slot matching with the bend portion to form an engagement.

13. The cylindrical lithium battery according to claim 8, wherein the seal ring is provided with a wrap portion, and the wrap portion is wrapped on an outer side of the explosion-proof disc.

14. The cylindrical lithium battery according to claim 13, wherein the seal ring is a plastic seal ring.

* * * * *